(No Model.)
G. H. THOMAS.
EGG BEATER.
No. 350,023. Patented Sept. 28, 1886.
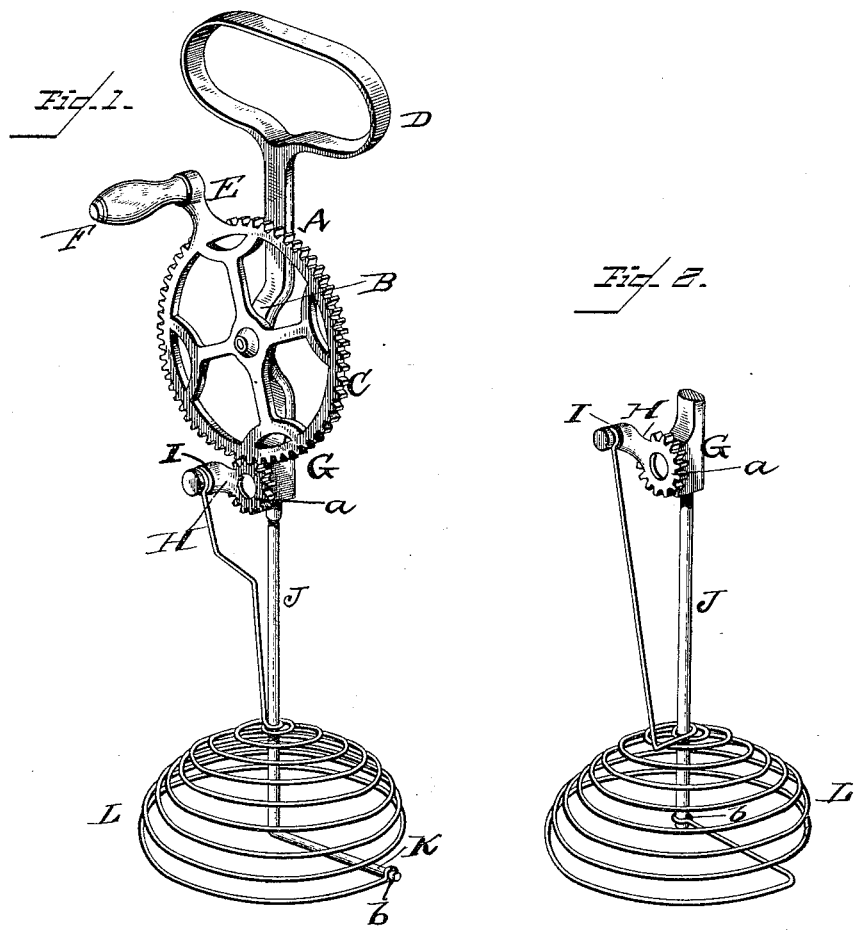
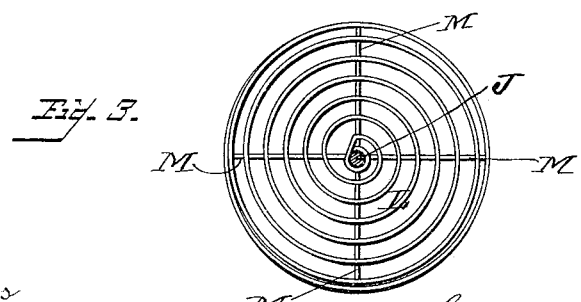
Witnesses
Inventor
George H. Thomas,
By his Attorney Chas J. Gooch

UNITED STATES PATENT OFFICE.

GEORGE H. THOMAS, OF CHICOPEE FALLS, MASSACHUSETTS.

EGG-BEATER.

SPECIFICATION forming part of Letters Patent No. 350,023, dated September 28, 1886.

Application filed March 6, 1886. Serial No. 194,282. (No model.)

*To all whom it may concern:*

Be it known that I, GEORGE H. THOMAS, a citizen of the United States of America, residing at Chicopee Falls, in the county of Hampden and State of Massachusetts, have invented certain new and useful Improvements in Egg-Beaters; and I do hereby declare the following to be a full, clear, and exact description of the invention, such as will enable others skilled in the art to which it appertains to make and use the same.

This invention relates to egg-beaters.

The improved beater consists, essentially, of a beater composed of a conically-coiled spring which is connected to a rod attached to the frame or hand-grasp of the article, and to suitable mechanism mounted upon the framing, whereby said spring-beater can be readily and rapidly operated by hand-power.

The invention will be more specifically described hereinafter in connection with the preferred construction and arrangement of the several accessories.

In the accompanying drawings, Figure 1 represents a perspective view of my improved egg-beater, showing effective operating mechanism connected thereto. Figs. 2 and 3 represent modifications.

In the drawings I have represented a suitable form of devices for operating the spring-beater, but these may be changed or modified at will so long as the essential characteristic of my invention be retained—to wit, a beater or dasher composed of a conical spring connected to the operative mechanism, so that the operation of said mechanism by hand shall agitate the spring.

A represents the frame, which at or about its center is curved to form a boss, B, to which the drive-wheel C is connected.

D represents the hand-grasp; E, a lug or arm extending from said wheel to which the operative handle F is attached.

G is the bottom of the frame, which is thickened so as to extend outward into line with the boss B. On this enlargement the pinion or gear wheel $a$ is pivotally mounted so as to gear with the drive-wheel. Extending from the outer face of this gear-wheel $a$ is a crank-arm, H, having a circumferential groove, I, formed therein within and to which the upper end of the wire forming the beater or dasher is connected.

J represents a rod, which at its upper end is connected to the bottom of the frame A either by solder, screw-threads, or other suitable means. The lower end of this rod extends outwardly at right angles, as shown at K, within the outer end of which is formed a groove or recess, $b$, to which one end of the spring-beater is connected.

L represents the spring-beater. It consists of a single strand of wire helically or conically coiled, with the coils gradually tapering from bottom to top, said wire at the apex of the spring-beater being loosely coiled around the rod J, and from thence extending upward in a straight line and somewhat closely to said rod for a short distance, and then being bent outwardly and upwardly and connected at its upper end to the lug or arm I extending from the gear-wheel. By thus extending the upper portion of the wire forming the spring-beater and bending the lower end of the rod at right angle the spring is adapted to freely turn or swing and adapt itself to any reasonable angle at which the beater may be held, and a firm support is afforded the beater at its lower end and the parts will not become bent or distorted in shape in use.

In the modification, shown in Fig. 2, the bottom of the rod J is vertical its whole length, and the recess or groove $b$ is formed in its bottom to which the lower end of the spring-beater is connected, the upper end of the spring-wire in this construction coiling loosely around the rod also and extending outwardly and upwardly therefrom to the gear-wheel.

In Fig. 3 the spring-beater is shown as connected to the rod J by cross-wires M.

I am aware that an egg-beater has been made with a conically-shaped wire-beater with the wire at its apex closely coiled around a wooden handle; but in such construction the beater consists of simply two elements—viz., the wire coil and the hand-grasp—and the only way of operating the beater is by grasping the wooden stick and forcing it up and down by hand which is a tedious and laborious proceeding.

I am also aware that it is not uncommon to secure the operation of egg-beaters, of different construction to that the subject of my present invention, by means of gearing mounted upon a frame and rotated by means of a crank attached to the drive-wheel.

By constructing my wire beater as shown and described and connecting its bottom portion to the rod depending from the frame, the beater is held steadily in position within the bowl by the pressure exerted thereon by the weight of the frame and the pressure exerted thereon by the hand of the operator using the beater, and by the employment of the power mechanism, as shown and described, not only is increased power imparted to the beating operation, but the beating is more rapidly accomplished, and the movements of the coils are more regular and uniform, and the beating is accomplished with greater rapidity and with very much less fatigue to the user than can possibly be the case where the beater is unsupported and where such operative mechanism as I have shown is omitted.

Having thus described my invention, what I claim is—

1. An egg-beater consisting of a supporting-frame, a rod depending therefrom, a beater consisting of a coiled wire spring rigidly connected at its bottom portion to the bottom of said depending rod, and mechanism mounted upon said frame and connected to the spring-beater by a wire extending upwardly therefrom and adapted to be operated by hand so as to reciprocate the beater by power transmitted through said mechanism, substantially as set forth.

2. An egg-beater consisting of a suitable frame, a drive-wheel, and an intermeshing pinion mounted thereon, a rod depending from said frame, and a spring-beater composed of a helically or other shaped coiled spring-wire connected at its bottom portion to said rod and having connection with the operative mechanism, substantially as and for the purpose set forth.

3. In an egg-beater, the combination, with a suitable frame, connecting drive-wheels, and a supporting-rod, of a spring-beater composed of a suitable coiled wire connected at its lower portion with said rod and at its apex loosely coiled around said shaft, so as to permit of its reciprocation thereon, and from thence extending up to and connecting with the hand-operating mechanism.

4. In an egg-beater, the combination, with a suitable frame having a drive-wheel mounted thereon, of a pinion gearing therewith and having an outwardly-extending grooved arm, a vertical rod depending from the framing, and a spring-beater connected at its lower end to said shaft and having its apex formed with an eye sliding thereon at its apex, and having an upwardly-extending arm or rod connecting with the grooved arm on the gear-pinion, substantially as and for the purpose set forth.

In testimony whereof I affix my signature in presence of two witnesses.

GEORGE H. THOMAS.

Witnesses:
NORRIS R. WOOD,
SIDNEY SANDERS.